United States Patent [19]

Bristol

[11] Patent Number: 5,004,509

[45] Date of Patent: Apr. 2, 1991

[54] LOW RESIDUE SOLDERING FLUX

[75] Inventor: Samuel V. Bristol, Kokomo, Ind.

[73] Assignee: Delco Electronics Corporation, Kokomo, Ind.

[21] Appl. No.: 519,076

[22] Filed: May 4, 1990

[51] Int. Cl.$^5$ .............................................. B23K 35/34
[52] U.S. Cl. ...................................... 148/23; 148/22; 148/24; 148/25
[58] Field of Search ..................................... 148/22–25

[56] References Cited

U.S. PATENT DOCUMENTS 2,898,255  8/1959  Thompson .............................. 148/23
4,149,931  3/1980  Zado ....................................... 148/25

*Primary Examiner*—Peter D. Rosenberg
*Attorney, Agent, or Firm*—Robert J. Wallace

[57] ABSTRACT

A low residue soldering flux contains a non-subliming dibasic acid mixture of by weight about 15–30% succinic acid, 40–63% glutaric acid and 10–30% adipic acid, e.g., in a volatilizable organic solvent, formed as a rosin-containing or rosin-free flux. The dibasic acid mixture is capable of volatilizing during heat soldering to leave a soldered product (e.g., an electronic circuit board) essentially free from corrosion-promoting ionic residue. This eliminates the need for a residue-removing washing step.

44 Claims, No Drawings

LOW RESIDUE SOLDERING FLUX

FIELD OF THE INVENTION

This invention relates to a low residue soldering flux, especially a flux containing a dibasic acid mixture, that in use is essentially non-corrosive and ionic residue-free.

BACKGROUND OF THE INVENTION

A soldering flux is used to aid fusion of the parts being joined, by reacting with and dissolving their surface oxides or impurities while coating the surfaces against oxidation, during soldering at a temperature above the solder melting point.

Organic fluxes are typically based on water-insoluble rosin or water-soluble organic acid. Activated rosin fluxes are used in soldering electrical connections on printed circuit boards. Wave soldering is used for mass production circuit board soldering as by applying the flux, preheating the board, applying the solder (e.g., via a molten solder standing wave), cooling the board, and cleaning it to remove flux residue.

Such flux residue is mainly constituted of ionic (e.g., acidic or basic) substances, and is corrosive, or can hydrolyze to corrosive constituents in the presence of moisture (e.g., air moisture). This can lead to short circuits, noise generation, etc., in use of the circuit board product. These adverse results are effectively avoided by subjecting the soldered board to a cleaning step to remove the ionic substances.

U.S. Pat. No. 2,715,084 to Konig shows a flux of rosin activated by a chain-brominated higher aliphatic monocarboxylic acid or salt of 8-24 chain carbon atoms (e.g., alpha-bromolauric acid), in turpentine, that does not decompose at the soldering temperature. It is non-corrosive as the chain bromine is not ionic so that the compound does not hydrolyze to corrosive halide, as with acid or halide salt flux, or rosin flux activated by organic base halide (e.g., cetyl-pyridinium halide), wherein the halide as an anion can hydrolyze in air to corrosive acid halide. Brominated acids of less than 8 carbon atoms are excluded as being corrosive and of less surface activity.

U.S. Pat. No. 2,898,255 to Thompson et al. shows a non-corrosive printed circuit board flux of rosin activated by a combination of both an aliphatic monocarboxylic acid (e.g., formic, acetic or propionic acid) and an aliphatic dicarboxylic acid (e.g., oxalic, malonic, succinic, glutaric or adipic acid), in isopropanol, that does not splatter during soldering. The sole example given of a non-splattering flux is a mixture of rosin (mp 120° C./248° F.), formic acid (bp 100° C./212.5° F.) and glutaric acid (bp 200° C./392° F.), in isopropyl alcohol, in which the low glutaric acid content (about 1%) is said to prevent splattering, while the given melting and boiling points of the components are said to permit step-by-step deoxidation of the oxide surface being soldered.

U.S. Pat. No. 2,904,459 to Kubota shows a liquid, paste or solid flux for electrical application. The flux is based on rosin converted to pure, stable abietic acid amine salt (e.g., diethylene amine salt), that is insoluble and does not hydrolyze, and whose neutral resinous residue on soldering is non-corrosive and non-hygroscopic, unlike commercial rosin which, besides a 25-30% content of abietic acid (i.e., a monobasic organic acid), that has fluxing action, also has a resinous remainder that can cause soldered product defects.

U.S. Pat. Nos. 3,235,414 and 3,264,146 to Marks show a rosin-free food can soldering flux. It is formed as a relatively concentrated solution of a large percentage (e.g., 25 wt. parts) of an aliphatic dicarboxylic acid of 9-10 carbon atoms with at least 4 carbon atoms in the chain separating the carboxyl groups (e.g., azelaic or sebacic acid), or its anhydride or ester, that is modified by (e.g., 1.2 wt. parts) ethanolamine hydrochloride, in (e.g., 75 wt. parts) dimethylformamide as polar solvent. Such acids with 3 or less separating carbon atoms are undesired in forming monoanhydrides from a single molecule.

U.S. Pat. No. 3,837,932 to Aronberg shows a 10-80% polycarboxylic acid particulate suspension (e.g., adipic acid), in an aqueous solution of 0.2-5% soluble gum (remainder 15-89.8% water), as rosin-free soldering flux for bonding lead storage battery plate lugs to straps, in which the acid (e.g., adipic) does not sublime at the high (482° C./900° F.) bonding temperature. Use of the dry particulate acid alone, applied to the lugs after preheating, is less preferred.

U.S. Pat. No. 4,168,996 to Zado shows a mixture of rosin, an activator with both a halogen and a destabilizing substituent, such as a halogenated mono or dibasic organic acid (e.g., 2,3-dibromosuccinic acid), and a solder surfactant such as a polycarboxylic acid (e.g., adipic, sebacic or azelaic acid), or hydroxyl substituted polybasic acid, and/or keto acid (e.g., levulinic acid), in ethanol or isopropyl alcohol, and optionally a secondary activator (e.g., diethylamine hydrochloride) and a non-ionic foaming agent, as activated rosin flux of synergistic effect for printed circuit boards.

Zado notes that using rosin with the activator or solder surfactant alone does not provide the synergistic effect, and that the combination acid containing rosin flux of the above-discussed Thompson patent is too acidic and corrosive for practical use in electronics soldering.

The importance of a residue-free soldered connection is discussed in the article entitled: "Europeans find ways to phase-out CFCs," *Electronic Packaging & Production*, Vol. 29, No. 1, January 1989, pp. 26 and 28, Linda Smith-Vargo, Associate Editor. The article notes that fluxes used in printed circuit board applications leave residues that must be cleaned, typically by an organic liquid based on fully halogenated chlorofluorocarbons or CFCs, but that in view of the need to reduce CFC emissions, due to environmental constraints, soldering procedures are needed that avoid CFCs yet produce a residue-free non-corrosive product.

It is desirable to have a flux for soldering metal connections in electrical applications such as printed circuit boards that does not produce a corrosion-causing and/or hydrolyzable ionic residue that requires a cleaning step for its removal.

SUMMARY OF THE INVENTION

This invention solves the foregoing problems by providing a low residue soldering flux and, particularly, a flux containing a dibasic acid mixture or three-acid mixture (TAM) that in use is essentially non-corrosive and ionic residue-free.

All percentages (%), parts (pts) or proportions set forth herein are by weight unless specifically indicated otherwise.

The low residue flux of the invention is used in heat soldering metal components, and the three-acid mixture is an essentially non-subliming dibasic acid mixture of succinic, glutaric and adipic acids. It especially contains about 15-30% succinic acid, 40-63% glutaric acid and 10-30% adipic acid and, more particularly, about 18-30% succinic acid, 51-61% glutaric acid and 11-30% adipic acid. The percentages of succinic, glutaric and adipic acid are based on the total dibasic acid mixture.

The three-acid mixture desirably has a melting point (mp) of about 90°-130° C. and a boiling point (bp) of about 150°-210° C., especially 170°-195° C., and is capable of essentially completely volatilizing during heat soldering to leave the site essentially free from ionic residue. In particular, it is capable of leaving at most a trace amount of residue of corrosive, or hydrolyzable potentially corrosive, ionic (e.g., acidic) constituents.

The soldered site such as an electronic circuit board needs no cleaning to remove the ionic residue (e.g., by chlorofluorocarbons or like environmentally objectionable washing liquids), and may be further processed without a cleaning step.

As used herein, essentially "non-subliming" means that the constituents of the three-acid mixture in the flux that volatilize during the heat soldering operation, remain volatilized and do not recondense and/or redeposit at the soldering site as ionic residue. Thus, the three-acid mixture is an essentially non-recondensing and non-redepositing volatilizable dibasic acid mixture according to the invention.

The flux may be a rosin flux comprising rosin and an effective activating amount of said three-acid mixture, or it may be a rosin-free flux comprising said three-acid mixture.

As to the rosin flux, the rosin and three-acid mixture may be in the relative proportion to each other of about 65-95% rosin and 5-35% three-acid mixture (i.e., in the ratio of about 65-95 parts rosin to 35-5 parts three-acid mixture). The flux may include a volatilizable flux vehicle, such as with the rosin and three-acid mixture being in a combined amount of about 1.25-55% and the vehicle in an amount of about 45-98.75%. The vehicle is also capable of essentially completely volatilizing to leave the site essentially ionic residue-free, and may be an organic solvent such as an aliphatic or cycloaliphatic alcohol, aliphatic carboxylic acid ester, cyclic ketone, or mixture thereof.

The vehicle of the rosin flux may optionally contain a minor diluent amount of deionized water, and thus may comprise about 70-100% solvent and 0-30% deionized water. The solvent and water may be typically in the relative proportion to each other of about 70-99.5% solvent and 0.5-30% water (i.e., in the ratio of about 70-99.5 parts solvent to 30-0.5 parts water). As used herein, a "minor" amount of water means at most about 30% of the total vehicle.

As to the rosin-free flux, it comprises a rosin-free, essentially non-subliming dibasic acid mixture of succinic, glutaric and adipic acids having a boiling point of about 150°-210° C., in a volatilizable flux vehicle, formed of a volatilizable organic solvent. The dibasic acid mixture is present in sufficiently dilute solution in the solvent (e.g., generally below about 10% concentration, preferable at most about 7.5% concentration), so as to be capable of essentially completely volatilizing during heat soldering to leave the soldering site essentially completely free from ionic residue.

In particular, the rosin-free flux comprises a rosin-free solution of about 0.2-1% of the three-acid mixture and 99-99.8% of a volatilizable organic solvent as the flux vehicle, such as an aliphatic or cycloaliphatic alcohol, an aliphatic carboxylic acid ester, or mixture thereof.

The vehicle of the rosin-free flux may also optionally contain a slight diluent amount of deionized water. As used herein, a "slight" amount of water means at most about 1% of the total vehicle.

DETAILED DESCRIPTION

Typically, the rosin flux of the present invention consists essentially of about 1-35% rosin, 0.25-20% of said three-acid mixture, 45-98.75% volatilizable organic solvent and 0-20% deionized water. The percentages of rosin, three-acid mixture, solvent and water are based on the total flux.

In a high rosin content flux, such as for general metal soldering, the flux of the invention typically contains about 25-35% rosin, 2.5-20% three-acid mixture, 45-60% solvent and 5-20% water. The solvent and water are typically in the relative proportion to each other of about 75-90% solvent and 10-25% water (i.e., in the ratio of about 75-90 parts solvent to 25-10 parts water). In a low rosin content flux, such as for circuit board component soldering, the flux of the invention typically contains about 1-8% rosin, 0.25-1% three-acid mixture, 90-98.75% solvent and 0-1% water. The solvent and water are typically in the relative proportion to each other of about 99-99.5% solvent and 0.5-1% water (i.e., in the ratio of about 99-99.5 parts solvent to 1-0.5 parts water).

The organic solvent may be an alcohol such as a lower boiling or lower aliphatic alcohol, typically a lower alkyl alcohol or lower alkanol, such as ethyl, n-propyl, isopropyl, n-butyl, sec-butyl, etc., alcohol, or higher boiling aliphatic or cycloaliphatic alcohol, such as tetrahydrofurfuryl alcohol (about bp 178° C.), and the like, or other such volatilizable aliphatic or cycloaliphatic alcohol in which the flux contents are soluble. As used herein, "lower" aliphatic, alkyl or alkanol means a chain of less than 5 carbon atoms. The alcohol is typically isopropyl alcohol (sp.g. 0.78), and it may be added to the rosin flux along with the rosin, as where a commercial rosin solution therein is used.

The organic solvent may also be any other appropriate solvent such as an aliphatic carboxylic acid ester of lower boiling point, e.g., below about 200° C. or higher boiling point, e.g., below about 250° C. The aliphatic carboxylic acid ester is especially an aliphatic dicarboxylic acid dilower alkyl ester or ester mixture, typically an alkanedioic acid dilower alkyl ester (lower alkyl alkanedioate) or ester mixture, such as succinic, etc., acid dimethyl ester, or a succinic, glutaric and adipic acid dilower alkyl ester mixture such as about 10-20% dilower alkyl succinate, 60-70% dilower alkyl glutarate and 10-20% dilower alkyl adipate, and, particularly, a mixture of refined methyl diesters of succinic, glutaric and adipic acids, or other such volatilizable ester in which the flux contents are soluble.

A preferred such mixture of refined methyl diesters is sold under the designation "DBE" solvent (DuPont Co.), as a liquid of about average molecular weight (m. wt.) 159, 5.3% solubility in water (20° C.), flash point 100° C. viscosity 2.4 cst. (25° C.), and surface tension 35.6 dynes/cm (20° C.), which has about bp 196°-225° C. and sp.g. 1.092 (20° C.), and contains 99.5% total ester content (min.), of about 16.5% dimethyl succinate, 66% dimethyl glutarate and 17% dimethyl adipate, plus approximately 0.2% methanol, 0.1% water (max.) and less than 10 ppm hydrogen cyanide.

Other such refined methyl diesters or diester mixtures are those sold under the following designations (DuPont Co.):

"DBE-2" solvent, as a liquid of about average m. wt. 163, 4.2% solubility in water (20° C.), flash point 104° C. and viscosity 2.5 cst. (25° C.), which has about bp 210°–225° C. and sp.g. 1.081 (20° C.), and contains 99.5% total ester content (min.), of about 0.5% dimethyl succinate, 76% dimethyl glutarate and 23% dimethyl adipate, plus approximately <0.1% methanol and 0.1% water (max.).

"DBE-3" solvent, as a liquid of about average m. wt. 173, 2.5% solubility in water (20° C.), flash point 102° C. and viscosity 2.5 cst. (25° C.), which has about bp 215°–225° C. and sp.g. 1.068 (20° C.), and contains 9.5% total ester content (min.), of about 0.5% dimethyl succinate, 10% dimethyl glutarate and 89% dimethyl adipate, plus approximately <0.1% methanol and 0.3% water (max.).

"DBE-4" solvent, as a liquid of about average m. wt. 146, 7.5% solubility in water (20° C.), flash point 94° C. and viscosity 2.5 cst. (25° C.), which has about bp 196° C. and sp.g. 1.121 (20° C.), and contains 99.5% total ester content (min.), of about 99.5+% dimethyl succinate, plus approximately <0.1% methanol and 0.1% water (max.).

"DBE-5" solvent, as a liquid of about average m. wt. 160, 4.3% solubility in water (20° C.), flash point 107° C. and viscosity 2.5 cst. (25° C.), which has about bp 210°–215° C. and sp.g. 1.091 (20° C.), and contains 99.5% total ester content (min.), of about 0.6% dimethyl succinate, 99% dimethyl glutarate and 0.1% dimethyl adipate, plus approximately <0.1% methanol and 0.1% water (max.).

"DBE-9" solvent, as a liquid of about average m. wt. 156, 5% solubility in water (20° C.), flash point 94° C. and viscosity 2.4 cst. (25° C.), which has about bp 196°–215° C. and sp.g. 1.099 (20° C.), and contains 98.5% total ester content (min.), of about 25% dimethyl succinate, 73% dimethyl glutarate and 1.5% dimethyl adipate, plus approximately 0.3% methanol and 0.5% water (max.).

The aliphatic carboxylic acid ester, e.g., where it has a boiling point of from about 196° C. to above about 200° C. is preferably used in admixture with an above type alcohol to lower the solvent boiling point.

Similarly, the solvent may be a cyclic ketone such as a cycloaliphatic, including azacycloaliphatic (i.e., N-heterocyclic), ketone, e.g., cyclopentanone, cyclohexanone, N-methyl-2-pyrrolidone (about bp 202° C.), or other such volatilizable ketone in which the flux contents are soluble. The cyclic ketone may also be used in admixture with an above type alcohol and/or ester to lower the solvent boiling point.

While the rosin flux is typically in liquid form, it may also be in paste or solid form, by admixing with a suitable volatilizable paste or solid carrier vehicle or extender, e.g., liquid or jelly (paste form) glycerol or a wax (solid form). All carrier vehicles or extenders used to provide the liquid, paste or solid flux must be chemically inert and compatible with the flux contents, solder and metal surfaces to be soldered, and capable of volatilizing during soldering to leave the site essentially ionic residue-free.

Typically, the rosin-free flux of the present invention consists essentially of a solution of about 0.5–1% three-acid mixture and 99–99.5% lower aliphatic alcohol, or of about 0.2–1% three-acid mixture, 2–10% aliphatic dicarboxylic acid dilower alkyl ester, 88–97.6% lower aliphatic alcohol and 0.2–1% water. The percentages of three-acid mixture, alcohol, ester and water are based on the total solution. The alcohol and ester may be of the same above type used for the rosin flux, and are especially isopropyl alcohol and such aliphatic dicarboxylic acid dilower alkyl ester or ester mixture, such as succinic, etc., acid dimethyl ester, or succinic, glutaric and adipic acid dilower alkyl ester mixture.

The ester is preferably a mixture of about 0–20% dilower alkyl succinate, 60–70% dilower alkyl glutarate and 10–20% dilower alkyl adipate, and, particularly, the refined methyl diesters of succinic, glutaric and adipic acids, sold under the designation "DBE" solvent (DuPont Co.), as noted above. The ester may also favorably be one of the type sold under the designations "DBE-2", "DBE-3", "DBE-4", "DBE-5" and/or "DBE-9" (DuPont Co.), as noted above.

The rosin-free flux can be used in soldering electronic circuit board components, and surprisingly has adequate fluxing action, despite the absence of rosin, due to the three-acid mixture makeup, while leaving minimal ionic residue.

The aliphatic carboxylic acid ester is not sufficiently acidic to act as a flux or to activate the three-acid mixture, but it has been found unexpectedly that the ester enhances the fluxing action of the three-acid mixture in the rosin-free flux due to its comparatively low surface tension (e.g., 35.6 dynes/cm). This enables it to serve as a strong wetting agent to aid spreading of the three-acid mixture on the parts to be joined, for improved soldering, while still leaving only a trace amount of ionic residue.

Where water is present, it serves to hydrolyze the ester and enhance its wetting action. However, ethylene glycol or similar hydrolysis inhibiting agent may be included to control the extent of hydrolysis of the ester that occurs in the presence of water. This ester hydrolysis inhibiting agent may be present in an amount up to about an equivalent amount to that of the water present, and will thereby control the free acid content of the aqueous flux solution.

Use of the ester advantageously decreases the amount of three-acid mixture required in the rosin-free flux.

The three-acid mixture is desirably present in the rosin-free flux in sufficiently dilute solution in the volatilizable solvent used to be capable of essentially completely volatilizing during heat soldering to leave the soldering site essentially free from ionic residue.

Generally, if the amount of the three-acid mixture in the rosin-free flux is below about 0.2% of the flux, the fluxing action is insufficient for the heat soldering operation. On the other hand, if the three-acid mixture amount is above about 1%, more particularly, above about 2%, especially above about 5%, and generally above about 7.5%, or at least above about 10%, of the total flux, the tendency is concordantly progressively increased during heat soldering for the ionic residue of the rosin-free flux to exceed an acceptably low level.

That acceptably low level is one that avoids the need for a washing step, as well as one which is attainable without the trouble and expense of supplemental heating of the soldering site to raise the ambient temperature sufficiently above the soldering temperature for artificially or extraneously insuring the essentially complete boiling off of the flux constituents.

Therefore, it is recommended for practical, efficient soldering, when using the rosin-free flux in circuit board soldering applications, to provide the three-acid mixture in an amount preferably below about 5%, more preferably, below about 2%, and especially not greater than about 1%, of the total flux. This will leave an essentially ionic residue-free soldering site consequent the normally conducted heat soldering operation, without splattering, subliming or local deposition of the flux constituents.

In the case of other soldering applications, where stronger fluxing action is necessary or desirable, and larger amounts of the three-acid mixture are employable to attain this action in using the rosin-free flux, the three-acid mixture amount may exceed about 1%, or about 2%, or even about 5%, of the total flux. In these circumstances, the amount of the three-acid mixture may even be increased up to about 7.5%, but will generally be less than about 10%, of the total flux.

Consequently, the actual amount of the three-acid mixture in the total rosin-free flux will be selected in dependence upon the nature of the metals being soldered, the degree of fluxing action required, and the soldering temperature contemplated for conjointly achieving effective fluxing action, molten solder flow and essentially complete volatilization of the flux constituents during the operation to leave an essentially non-corrosive and ionic residue-free soldered product.

In both the rosin flux and rosin-free flux, the solvent is preferably miscible with water to enable water to be added optionally as a diluent to decrease solvent cost and enhance foamability of the flux, thereby aiding its spreading action. As the solvent and water boil off during soldering, their presence is not detrimental to the product. No more than a minor amount of water is used so as to inhibit splattering and deposition of residue at the soldering site, and possibly solder ball formation, that adversely affect product quality. As an essentially ionic residue-free product is desired, deionized water is used to avoid increasing the ionic residue.

In heat soldering metal surfaces, solder is applied to the surfaces in the presence of an effective amount of the flux in coating disposition on the surfaces, and at a temperature sufficient for molten flow of the solder and for volatilizing the flux to leave the site essentially ionic residue-free. The soldering may be at conventional temperature, e.g., about 200°–500° C. preferably about 250°–350° C. For example, circuit board components may be soldered at the lower end of the temperature range and other connections at the higher end of the range.

The solder may be of any known type such as tin-lead solder, e.g., 60% Sn - 40% Pb of mp 191°–193° C. or eutectic tin-lead solder, e g., 63% Sn - 37% Pb of mp 183° C.

The flux is applied to the surfaces to be joined by conventional technique, e.g., foaming, wave fluxing, spraying, brushing, rolling, dipping, etc., and the solder applied to the flux coated surfaces in usual manner, e.g., drop dispensing, wave soldering, etc., to form the solder deposit. Then, the surfaces are contacted to join them at the soldering temperature, which also causes boiling off of the flux constituents.

Normally, the attaining of a low ionic residue at the site is a function of the soldering temperature used during the operation. Thus, the amount of the three-acid mixture in the rosin flux is selected to achieve adequate activation of the rosin and essentially complete volatilization of the three-acid mixture under the given soldering conditions to assure that only a low ionic residue will remain. Likewise, the three-acid mixture amount in the rosin-free flux is selected to achieve adequate fluxing action and essentially complete volatilization of the three-acid mixture under the given soldering conditions so as also to assure the attaining of such low ionic residue.

Simple test runs may be used to optimize the three-acid mixture amount needed in the flux for the intended purposes at the given soldering temperature while also satisfying the aim of leaving a low ionic residue at the soldering site.

In sum, the invention provides a non-corrosive flux for soldering metals (e.g., tin plate, copper, brass, nickel, etc.), wherein the three-acid mixture imparts properties to the flux significantly different from those of the individual acids, for adequate fluxing action, yet leaving minimal ionic residue.

Particular advantages of the invention flux include:
(1) A three-acid mixture maximum boiling range, e.g., 150°–210° C. that is significantly below the 235° C. boiling point of succinic acid, its component of lowest boiling temperature.
(2) A three-acid mixture which does not sublime like its component succinic acid, and thus does not condense on adjacent areas, e.g., of circuit boards, during soldering, even though adequate precaution is not taken to minimize this effect.
(3) A three-acid mixture of unique quality permitting use of rosin fluxes of as low as about 1–2% rosin content providing adequate foaming during soldering without adding a surfactant.
(4) A composition of pleasant odor and that does not form noxious and pungent break-down products during soldering.
(5) A three-acid mixture that costs less than each of its constituents that could be used individually as an activator.
(6) A three-acid mixture usable as a rosin-free flux.
(7) The attaining of the above-listed advantages with a three-acid mixture as essential component, whether in purified state or not, and thus contemplating commercial purity three-acid mixtures, while providing a stable flux of good cleaning action leaving so low a residue after soldering that no corrosive property is exhibited and no residue removal is needed.

The proportions of the three acids to each other in the three-acid mixture, and of all components in the flux, are selected to provide surface tension properties and a boiling point that enhance flux spreading and "wetting" of the surfaces being soldered and volatilization with innocuous decomposition without splattering, subliming or local redeposition.

At most, only a trace amount of residue is left on the product. The ionic content of this residue, expressed as micrograms per square centimeter equivalent of NaCl (per Omega Meter measurement, as later explained), is very low, i.e., below about 5 $\mu$g/cm$^2$, and especially below about 3 $\mu$g/cm$^2$ for the rosin flux, and below about 1.2 $\mu$g/cm$^2$ for the rosin-free flux.

As used herein, the term a "trace" amount means a very small amount that is less than about 5 $\mu$g/cm$^2$, i.e., a microgram amount corresponding to less than five millionths of a gram (0.000,001 g) per sq. cm. area (cf.

Hackh's Chemical Dictionary, 4th ed. 1969; p. 686: "trace"—a very small quantity, usually less than 5 gamma per gm; p. 288: "gamma"—$10^{-6}$ gm; p. 429: "microgram"—$\mu g$, gamma, one-millionth of a gram).

On using the flux of the invention, cleanliness tests for residual ionic contamination (per said Omega Meter measurement) showed that unwashed soldered electronic circuit boards had ionic residues below a trace amount, while corresponding soldered boards after washing in Freon TMS (DuPont Co.), a chlorinated solvent, had only slightly lower residues. Thus, use of the invention flux affords a reliable quality product of acceptably low ionic residue without cleaning, and even with cleaning, the ionic residue is only slightly further reduced.

The treatise, Kirk-Othmer Encyclopedia of Chemical Technology, 3rd ed , John Wiley & Sons, provides a review of "Dicarboxylic Acids" (vol. 7: 614–625), i.e., the saturated, linear aliphatic series of dicarboxylic acids (diacids), from which melting and boiling point data as to the first nine of these organic dibasic acids are compiled in Table A.

TABLE A

Melting and Boiling Points

| Total carbon atoms | UIPAC name | Common name | mp °C. | bp °C. |
|---|---|---|---|---|
| 2 | ethanedioic | oxalic | 187 (dec) | |
| 3 | propanedioic | malonic | 134–136 (dec) | |
| 4 | butanedioic | succinic | 187.6–187.9 | |
| 5 | pentanedioic | glutaric | 98–99 | $200_{2.7}$ kPa |
| 6 | hexanedioic | adipic | 153.0–153.1 | $265_{13.3}$ kPa |
| 7 | heptanedioic | pimelic | 105.7–105.8 | $272_{13.3}$ kPa |
| 8 | octanedioic | suberic | 143.0–143.3 | $279_{13.3}$ kpa |
| 9 | nonanedioic | azelaic | 107–108 | $286.5_{13.3}$ kPa |
| 10 | decanedioic | sebacic | 134.0–134.4 | $294.5_{13.3}$ kPa |

*To convert kPa to mm Hg, multiply by 7.5: 2.7 kPa × 7.5 = 20 mm Hg; 13.3 kPa × 7.5 = 100 mm Hg. From that same treatise, data as to the ionization constants of these diacids are also compiled in Table B.

From that same treatise, data as to the ionization constants of these diacids are also compiled in Table B.

TABLE B

| Diacid | Ionization Constants in Water | | |
|---|---|---|---|
| | Temp., °C. | K1 | K2 |
| oxalic | 25 | $5.36 \times 10^{-2}$ | $5.42 \times 10^{-5}$ |
| malonic | 25 | $1.42 \times 10^{-3}$ | $2.01 \times 10^{-6}$ |
| succinic | 25 | $6.21 \times 10^{-5}$ | $2.31 \times 10^{-6}$ |
| glutaric | 25 | $4.58 \times 10^{-5}$ | $3.89 \times 10^{-6}$ |
| adipic | 25 | $3.85 \times 10^{-5}$ | $3.89 \times 10^{-6}$ |
| pimelic | 18 | $3.19 \times 10^{-5}$ | $3.74 \times 10^{-6}$ |
| suberic | 18 | $3.05 \times 10^{-5}$ | $3.85 \times 10^{-6}$ |
| azelaic | 18 | $2.88 \times 10^{-5}$ | $3.86 \times 10^{-6}$ |
| sebacic | 25 | $3.1 \times 10^{-5}$ | $3.6 \times 10^{-6}$ |

Selected characteristics based on Tables A and B, and the molecular weights of these diacids are given in Table C.

Selected characteristics based on Tables A and B, and the molecular weights of these diacids are given in Table C.

TABLE C

| | | Selected Characteristics | | | |
|---|---|---|---|---|---|
| Acid | Formula | M. Wt. | mp °C. | bp °C. | K1 |
| oxalic | HOOC—COOH | 90 | 187d | | $5.36 \times 10^{-2}$ |
| malonic | HOOC CH$_2$COOH | 104 | 135d | | $1.42 \times 10^{-3}$ |
| succinic | HOOC(CH$_2$)$_2$COOH | 118 | 188 | 200* | $6.21 \times 10^{-5}$ |
| glutaric | HOOC(CH$_2$)$_3$COOH | 132 | 98.5 | 265** | $4.58 \times 10^{-5}$ |
| adipic | HOOC(CH$_2$)$_4$COOH | 146 | 153 | 272** | $3.85 \times 10^{-5}$ |
| pimelic | HOOC(CH$_2$)$_5$COOH | 160 | 106 | 279** | $3.19 \times 10^{-5}$ |
| suberic | HOOC(CH$_2$)$_6$COOH | 174 | 143 | 286.5** | $3.05 \times 10^{-5}$ |
| azelaic | HOOC(CH$_2$)$_7$COOH | 188 | 107.5 | 294.5** | $2.88 \times 10^{-5}$ |
| sebacic | HOOC(CH$_2$)$_8$COOH | 202 | 134 | | $3.1 \times 10^{-5}$ |

*20 mm Hg
**100 mm Hg

That treatise points out that these diacids are crystalline solids, whose melting points decrease as the aliphatic chain length (m. wt.) increases, with alternation of some physical properties of neighboring members of the series such as oscillating melting point, water solubility and ease of decarboxylation or decomposition, but not of others such as boiling point, density and dielectric constant. Whereas the odd-numbered acids melt lower than their neighbors, e.g., the 5 carbon atom glutaric acid melting much lower than the neighboring 4 carbon atom succinic acid and 6 carbon atom adipic acid, their boiling points increase with increasing molecular weight.

The boiling points of the lower (m. wt.) diacids are difficult to measure as they sublime, dehydrate or decompose, the even-numbered carbon atom acids being more resistant to decarboxylation or decomposition than the odd-numbered acids preceding them. Their thermal decomposition is sensitive to catalytic effects of impurities, environment and the decomposition products themselves, and results in decarboxylation to a monocarboxylic acid or anhydride formation, with water elimination, succinic and glutaric acids forming cyclic anhydrides and adipic acid forming polymeric (linear) anhydride.

Malonic and glutaric acids are extremely water soluble, the remaining even-numbered acids being only moderately soluble, solubility alternating between higher values for the odd-numbered acids and lower values for their even-numbered neighbors, yet rapidly decreasing with increasing chain length (m. wt.). Oxalic and malonic acids are strong acids and the higher homologues (m. wt.) are progressively weaker. While the odd-numbered acids have lower ionization constants than their even-numbered neighbors, the ionization constant values become almost constant for all the acids above adipic acid.

Elsewhere, that treatise notes that malonic acid loses carbon dioxide on heating above its melting point, and in aqueous solution, undergoes decarboxylation at 70° C. (vol. 14: 794–795); that succinic acid sublimes when heated below its 188° C. melting point, dehydrates at its melting point, and forms a cyclic anhydride, succinic anhydride having mp 119.6° C. (vol. 21: 848–849); and that adipic acid, unlike glutaric acid and succinic acid, does not readily form a cyclic anhydride, but decomposes to cyclopentanone above 225° C. (vol. 1: 510-513).

The Merck Index, 10th ed. 1983, Merck & Co., Rahway, N.J., shows similar data as to these nine diacids, especially their boiling points at normal pressure (760 mm Hg). It indicates that oxalic acid sublimes at 157° C. decomposes at higher temperature, and is hygroscopic and poisonous; that malonic acid melts with decomposition at about 135° C.; that succinic acid has mp 185°-187° C. and bp 235° C. with partial conversion to the anhydride (of mp 119.6° C. and bp 261° C.); that glutaric acid has mp 97.5°-98° C. and bp 302°-304° C. with very slight decomposition; that adipic acid has mp 152° C. and bp 337.5° C. and is not hygroscopic; and that pimelic acid tends to sublime.

Oxalic and malonic acids are undesirable for this invention because of their low molecular weights, strong acidity and high dissociation constants, and the fact that oxalic acid sublimes at 157° C. and is hygroscopic while malonic acid decomposes at its 135° C. melting point, thereby adversely affecting the flux characteristics and causing large ionic residues, e.g., from decomposition and sublimation products.

Pimelic and higher acids are undesirable for this invention because of their cost, and high molecular weights and boiling points (which increase with their increasing molecular weights) that may adversely affect the characteristics and adequacy of boiling off of the flux. Pimelic acid is not only costly, but also may splatter and sublime to expose the circuit board to local deposition of sublimation or decomposition constituents detracting from product quality.

While succinic acid also tends to sublime, and glutaric acid is quite water soluble, compared to non-hygroscopic adipic acid, on using these three acids as a mixture in the above-stated proportions, the average molecular weight and depressed boiling point of the mixture, as opposed to the individual acids, seem to impart efficient spreading action to the flux, and the higher content lower boiling glutaric acid seems to aid boiling off of the lower content higher boiling succinic and adipic acids, as it has been found that the flux spreads without voids, does not splatter and leaves a low residue.

The rosin for the rosin flux of the invention may be water-white rosin or rosin in suitable formulation form, such as a commercially available liquid, e.g., a solution in a volatile solvent such as isopropyl alcohol, or solid, e.g., a synthetic rosin-containing resin preparation.

A first commercial rosin formulation, sold under the designation KESTER #135 Flux (Litton/Kester Solder Co., Des Plaines, Ill.), as a non-activated, Type R, rosin flux, is a homogeneous solution of water-white rosin in isopropyl alcohol, of non-corrosive and non-conductive properties like rosin, and processed to remove the foreign particles found in natural rosin. It has 41% rosin plus 59% isopropyl alcohol, 77° C. (170° F.) boiling point, sp.g. 0.880, 66 vol. % volatile content, 59% water solubility and 18° C. (65° F.) flash point.

A second commercial rosin formulation, sold under the designation ULTRA-DRY Flux #UD-3040 (Urban Chemical Co., Deerfield, Ill.), has 40% rosin and 60% isopropyl alcohol, 93° C. (200° F.) boiling point, sp.g. 0.884, 66 vol. % volatile content and 21° C. (70° F.) flash point.

A third commercial rosin formulation, sold under the designation STAYBELITE resin (Hercules Inc., Wilmington, Del.), is a synthetic rosin-containing resin preparation, comprising a solid product formed of hydrogenated rosin.

The three-acid mixture or TAM used for the rosin flux and rosin-free flux of the invention may also be from any source, such as a commercial mixture of succinic, glutaric and adipic acids in which the three acids are in the desired proportions.

A first commercial mixture is a blend of the three acids available from DuPont Canada, Inc. (DuPont Canada), of good solubility, mild acidity (ph 2.95), melting range 90°-130° C. and boiling range 170°-195° C., which has:

TAM Formulation #1 - assay 97.0% (min.), 26-30% succinic acid, 55-59% glutaric acid and 11-15% adipic acid, plus 3% acid anhydrides (average), 0.8% succinimide (max.), 0.6% glutarimide (max.), 0.3% water (max.) 1 ppm copper (max.), 1 ppm vanadium (max.), and 5 ppm iron (max.). Typically, it has assay 97.6%, 27.7% succinic acid, 56.6% glutaric acid and 13.2% adipic acid, plus 2.7% acid anhydrides, 0.7% succinimide, 0.56% glutarimide, 0.08% water, 0.28 ppm copper, 0.1 ppm vanadium and 1.9 ppm iron; or it has about 27% succinic acid, 57.5% glutaric acid and 11.6% adipic acid, plus about 4% acid anhydrides, 0.7% succinimide, 0.5% glutarimide and 0.2% water.

A second commercial mixture is the product, designated "DBA", available from DuPont Co., Wilmington, Del. (DuPont), of 20% water solubility (18° C./64° F.), which has:

TAM Formulation #2 - 18-28% succinic acid, 51-61% glutaric acid and 15-25% adipic acid, plus 1% organic nitrogen compounds, 0.2% nitric acid, 0.02% copper and 0.01% vanadium, and is available in a 50% concentration solution of the three acids in deionized water, sp.g. 1.106, having 26% succinic acid, 55% glutaric acid and 18% adipic acid, plus 0.3% nitric acid.

A third commercial mixture is a dicarboxylic acid product available from BASF Corp., Parsippany, N.J., of about 10% water solubility (room temp.), and about 100°-130° C. melting range and 150°-210° C. boiling range, which has:

TAM Formulation #3 - assay 97% (min.), 25-30% succinic acid, 42-47% glutaric acid and 25-30% adipic acid, plus 2.3% 2,5-pyrrolidinedione and 2,6-piperidinedione, and 0.5% water.

A fourth commercial mixture is the product, designated "Diacides AGS", available from Rhone-Poulenc Inc., Princeton, N.J., of about 10% water solubility (room temp.) and 100°-130° C. melting range, which has:

TAM Formulation #4 - 18-25% succinic acid, 50-55% glutaric acid and 20-25% adipic acid, plus 1.4% succinic anhydride, and particularly 19.5% succinic acid, 51.6% glutaric acid and 22.6% adipic acid, plus 1.4% acid anhydrides (as succinic anhydride), 0.06% nitrogen (kjeldahl), 0.3% water, 0.4 ppm copper, 0.06 ppm vanadium and 2.4 ppm iron.

These TAM formulations are especially usable as the three-acid mixture, with the components in the range of about 18-30% succinic acid, 51-61% glutaric acid and 11-30% adipic acid.

It was quite unexpected that these three-acid mixtures, per TAM formulations #1-4, which are not especially purified, perform satisfactorily in the flux to provide consistent solderability under the relatively rigid conditions extant in electronic circuit board component soldering, yet leave the site essentially free from ionic residue and avoid a washing step, despite the impurities in such commercial grade mixtures.

This is especially so in view of the above indication in the Kirk-Othmer treatise that thermal decomposition of these diacids is sensitive to catalytic effects of impurities, and potentially those listed in commercial TAM formulations #1-4.

The costs of chemicals in pure and commercial grade form are influenced by many factors, yet provide useful comparisons. Recently noted costs of the three pertinent acids in pure form, and the next higher acid, pimelic, are compared in Table D.

TABLE D

| Comparative Costs of Individual Acids | | | |
|---|---|---|---|
| Acid | Unit Cost | Calculated Cost Per Kg | |
| Succinic | $126.90/2.5 kg | $ 50.76 | 50.76 |
| Glutaric | 14.20/25 g | 568.00 | — |
| Adipic | 24.60/2 kg | 12.60 | 12.60 |
| Pimelic | 61.25/100 g | — | 612.50 |
| Total | | 631.36 | 675.86 |
| Average | | 210.45 | 225.28 |

Arbitrarily taking equal amounts of the three acids as a mixture, comes to an average cost of $210.45/kg, and substituting pimelic for glutaric acid increases it to $225.28/kg, and even higher if it is substituted for succinic or adipic acid. Any such substitution would change the properties of the resulting mixture, given the differences in melting and boiling points among these acids and the increase in average molecular weight imparted by the heavier pimelic acid component, aside from the objectionable tendency of pimelic acid to sublime.

More important, the cost of the commercial purity mixtures of succinic, glutaric and adipic acids, per TAM formulations #1-4 above, is roughly $1.25/kg ($0.57/lb), which is far less than the above calculated average cost of a mixture of the pure acids, and a comparable mixture in which pimelic acid is substituted for glutaric acid would be even more expensive. Despite the lower purity of these commercial mixtures in the flux and the need to limit the ionic residue to, at most, a trace amount, they surprisingly perform eminently satisfactorily for the purposes of the invention, without having to formulate the mixture from the high purity individual acids at high cost.

Based on the above Merck Index data, their melting and boiling points may be taken generally as set forth in Table E.

TABLE E

| Approximate Melting and Boiling Points | | |
|---|---|---|
| Acid | mp °C. | bp °C. |
| Succinic | 186 | 235 |
| Glutaric | 98 | 303 |
| Adipic | 152 | 337.5 |
| Total | 436 | 875.5 |
| Average | 145° C. | 292° C. |

The commercial mixtures of these acids have 90-130 and 100°-130° C. mp ranges, and 170-195 and 50-210° C. bp ranges, of average mp 110° C. and bp 180° C. well below the Table E averages. The commercial mixture mp range is below the boiling points of succinic and adipic acid, and its bp range is below the boiling point of succinic acid, i.e., the lowest of the three acids.

A distinct benefit of the commercial mixture depressed boiling range is that the acids boil away to leave a low ionic residue, so that the impurities in the commercial grade mixtures and high acidity of their dibasic acid content have been found not to be a problem. When the three acids are in the above-noted ranges, optimum results are achievable for adequately coating the surfaces to be soldered, while inhibiting splattering, sublimation and local redeposition.

Despite the high acid content and impurities in the commercial mixtures, the constituents boil off at ambient soldering conditions, avoiding a large ionic residue and a washing step for its removal, and the low ionic residue that is left occurs without supplemental heating as normally used to prevent local redeposition of constituents. The flux assures more consistent solderability in attaining a low ionic residue product, and soldering occurs without causing annoying or noxious odors on the circuit boards or fixtures, and provides a circuit board product whose surfaces have a desired post-solder dryness and non-tack condition without use of special steps.

As to the rosin-free flux of the invention, the inclusion of the aliphatic carboxylic acid ester, especially said "DBE" solvent (DuPont Co.), with the lower aliphatic alcohol, such as isopropyl alcohol (IPA), is particularly desirable because of the low surface tension imparted to the three-acid mixture solution formulation, as when used for foam, spray and wave application. The replacement of the rosin component by the ester component correspondingly lowers the rosin-free flux cost, and use of the ester component permits convenient adjustment of the amount of the three-acid mixture component by replacement of a portion of this component by the ester component at comparable cost.

Recently noted costs of pertinent earlier mentioned commercially available chemical and chemical formulation components of the flux are compared in Table F.

TABLE F

| Comparative Costs of Various Components | | |
|---|---|---|
| Component | Cost Per Gal. | Calculated Cost Per Kg |
| DBE solvent | $5.15-5.20 | $1.25-1.26 |
| KESTER #135 | 10.70 | 3.21 |
| (41% rosin) | — | (1.32) |
| (59% IPA) | — | (1.89) |
| ULTRA-DRY Flux #UD-3040 | 19.55 | 5.84 |
| (40% rosin) | — | (2.34) |
| (60% IPA) | — | (3.50) |
| STAYBELITE resin | — | 2.75-2.97* |
| IPA | 2.19-2.20 | 0.74-0.75 |

*1.25-1.35/lb

Table F shows that the cost of "DBE" solvent (sp.g. 1.092) is about the same as the above-indicated cost of the TAM formulations #1-4, and less than the calculated, arbitrarily 41% or 40% allocated, rosin portion cost of the respective commercial IPA (isopropyl alcohol) solutions of rosin (KESTER #135, sp.g 0.880; ULTRA-DRY Flux #UD-3040, sp.g. 0.884), as well as less than the cost of the hydrogenated rosin preparation (STAYBELITE resin). Given the low cost of IPA (sp.g. 0.78), the cost of the rosin portion of the commercial IPA solutions of rosin (KESTER #135 and ULTRA-DRY Flux #UD-3040) must actually be considered higher, and its IPA portion cost lower, than as shown in Table F.

The rosin-free flux of the invention is of especial advantage in achieving an extremely low ionic content flux residue on soldering, at a relatively low materials cost. The rosin flux of the invention is also of advantage, as it has an acceptably low materials cost, and achieves an acceptably low ionic content flux residue on soldering as well. Most significant is the fact that both the rosin flux and rosin-free flux can provide a soldered product in usable form as produced, without the trouble and expense of a washing step to remove ionic residue and/or of supplying supplemental heat during the soldering to assist volatilization of the flux constituents.

Typically, the rosin flux is useful in soldering output assemblies to copper buffer plates on ignition assemblies of motor vehicles, and both the rosin and rosin-free fluxes are useful in electronic circuit board soldering, to attain in all cases a significant decrease in the number of product rejects from shorts, voids and like defects, without a washing step.

However, in using the rosin flux for circuit board soldering, there may be instances when efficient electrical contact is difficult to achieve between certain mechanical switch contact surfaces (e.g., on gold or silicone rubber mechanical switch components), due to the interfering presence of a slight residue of rosin that acts as an electrical insulator thereat. This can occur even though the attendant ionic residue is acceptably low. By use of the rosin-free flux instead, in these instances, this problem does not arise.

Employing a combination of the alcohol component and the ester component as organic solvent in the rosin-free flux to form the desired sufficiently dilute solution of the three-acid mixture for achieving an essentially ionic residue-free soldering site is particularly preferred. The alcohol (e.g., IPA) is a very low-cost polar liquid component of relatively low boiling point and acceptably low surface tension below that of water (the surface tension of water being about 72.8 dynes/cm, at 20° C.). The ester (e.g., DBE) is a liquid component of low cost comparable to that of the three-acid mixture, and of suitably low boiling point and especially low surface tension.

These conjoint beneficial features are attained in the rosin-free flux, such as where the alcohol and ester are in the relative proportion to each other of about 1–99% alcohol and 99–1% ester, especially 50–99% alcohol and 50–1% ester, and the three-acid mixture is in a concentration therein of less than 10%, especially not more than about 7.5%. Stated another way, the alcohol and ester components are advantageously in the ratio of about 1–99 parts alcohol to 99–1 parts ester, and especially 50–99 parts alcohol to 50–1 parts ester, and their combined total represents more than 90% of the rosin-free flux solution, the corresponding less than 10% remainder of the solution being the three-acid mixture.

As inclusion of the ester component advantageously lowers the corresponding amount of the three-acid mixture needed in the rosin-free flux, the amount of the ester component will usually be sufficient where the alcohol component and ester component are in the proportion of about 50–99% alcohol and 50–1% ester, for a three-acid mixture dilute solution concentration therein of about 0.2–7.5%, especially 0.2–5%, and particularly 0.2–2%.

As the optional inclusion of deionized water further lowers the cost and aids foaming where desired, its hydrolyzing effect on the ester component can be readily controlled by conjoint inclusion of a hydrolysis inhibiting agent. The influence of the low surface tension property of the ester component on the alcohol component and included water will thereby be retained, while any increase in acidity of the three-acid mixture containing solution, traceable to ester hydrolysis, will be minimized.

The following examples in which all parts and percentages are by weight unless otherwise indicated, are set forth by way of illustration and not limitation of the invention.

EXAMPLE 1—High Rosin Aqueous Alcoholic Flux (a) The above-noted TAM (three-acid mixture) Formulation #1 (DuPont Canada), of 26–30% succinic acid, 55–59% glutaric acid and 11–15% adipic acid, plus 3.0% acid anhydrides, 0.8% succinimide, 0.6% glutarimide and 0.3% water, was dissolved in deionized water in proportions to form an aqueous TAM solution of sp.g. 1.084 (0.3703703 g/ml TAM and 0.7136296 g/ml water, total 1.084 g/ml), corresponding to 135 ml of 50 g TAM (34.2%) and 96.34 g water (65.8%), total 146.34 g; or to 1401.29 ml of 519 g TAM (34.2%) and 1000 g water (65.8%), total 1519 g.

(b) 2705 ml of KESTER #135 Flux solution, sp.g. 0.88, totaling 2380.4 g (0.88×2705), of 41% or 975.96 g (2380.4×0.41) rosin and 59% or 1404.44 g (2380.4×0.59) IPA (isopropyl alcohol), were combined with 780 ml or 845.52 g (780×1.084) TAM solution from (a), of 288.89 g (780×0.3703703) TAM (34.2%) and 556.63 g (780×0.7136296) water (65.8%), plus 300 ml IPA (sp.g. 0.78), or 234 g (300×0.78), to form 3785 ml or 1 gal. of flux.

The flux, by calculation, contained 987.96 g rosin (28.2%), 288.89 g TAM (8.3%), 1638.44 g (1404.44+234) IPA (47.4%) and 556.63 g water (16.1%), total 3459.92 g of sp.g. 0.9141 (3459.92/3785), for a rosin content of 28.2% corresponding to 26 vol. % (987.96/3785).

EXAMPLE 2—High Rosin Aqueous Alcoholic Flux

EXAMPLE 1 was repeated except that 3095 ml of KESTER #135 Flux solution, totaling 2723.6 g (0.88×3095), of 41% or 1116.68 g (2723.6×0.41) rosin and 59% or 1606.92 g (2723.6×0.59) IPA, were combined with 390 ml or 422.76 g (390×1.084) TAM solution, of 144.44 g (390×0.3703703) TAM (34.2%) and 278.32 g (390×0.7136296) water (65.8%), plus 300 ml or 234 g IPA, to form 3785 ml or 1 gal. of flux.

The flux, by calculation, contained 1116.68 g rosin (33.0%), 144.44 g TAM (4.3%), 1840.92 g (1606.92+234) IPA (54.5%) and 278.32 g water (8.2%), total 3380.36 g of sp.g. 0.8931 (3380.36/3785), for a rosin content of 33.0% corresponding to 30 vol. % (1116.68/3785).

EXAMPLE 3—High Rosin Aqueous Alcoholic Flux (a) The above-noted TAM Formulation #2 in a 50% concentration solution of the three acids in deionized water (DuPont), sp.g. 1.106, of 26% succinic acid, 55% glutaric acid and 18% adipic acid, plus 0.3% nitric acid, was used in (b). By calculation, this 50/50 concentration solution corresponded to 0.553 g/ml TAM and 0.553 g/ml water, total 1.106 g/ml.

(b) EXAMPLE 1 was repeated except that the 50% concentration TAM solution of (a) was used as the TAM solution, and 2765 ml of KESTER #135 Flux solution, totaling 2433.2 g (0.88 ×2765), of 41% or 997.61 g (2433.2×0.41) rosin and 59% or 1435.59 g (2433.2×0.59) IPA, were combined with 720 ml or 796.32 g (720×1.106) TAM solution, of 398.16 g (720×0.553) TAM (50%) and 398.16 g (720×0.553) water (50%), plus 300 ml or 234 g IPA, to form 3785 ml or 1 gal. of flux.

The flux, by calculation, contained 997.61 g rosin (28.8%), 398.16 g TAM (11.5%), 1669.59 g (1435.59+234) IPA (48.2%) and 398.16 g water (11.5%), total 3463.52 g of sp.g. 0.9151 (3463.52/3785), for a rosin content of 28.8% corresponding to 26 vol. % (997.61/3785).

EXAMPLE 4—High Rosin Aqueous Alcoholic Flux

EXAMPLE 3 was repeated except that 2705 ml of KESTER #135 Flux solution, totaling 2380.4 g (0.88×2705), of 41% or 975.96 g (2380.4×0.41) rosin and 59% or 1404.44 g (2380.4×0.59) IPA, were combined with 780 ml or 862.68 g (780×1.106) TAM solution, of 431.34 g (780×0.553) TAM (50%) and 431.34 g (780×0.553) water (50%), plus 300 ml or 234 g IPA, to form 3785 ml or 1 gal. of flux.

The flux, by calculation, contained 975.96 g rosin (28.1%), 431.34 g TAM (12.4%), 1638.44 g (1404.44+234) IPA (47.1%) and 431.34 g water (12.4%), total 3477.08 g of sp.g. 0.9186 (3477.08/3785), for a rosin content of 28.1% corresponding to 26 vol. % (975.96/3785).

Table G shows the proportions (gms, % and parts) of the ingredients in the high rosin content fluxes of Examples 1-4.

TABLE G

| | High Rosin Fluxes of the Invention | | | | | | | |
|---|---|---|---|---|---|---|---|---|
| | Ex. 1 Grams | | Ex. 2 Grams | | Ex. 3 Grams | | Ex. 4 Grams | |
| | | Wt. % | | Wt. % | | Wt. % | | Wt. % |
| Rosin | 975.96 | 28.2 | 1116.68 | 33.0 | 997.61 | 28.8 | 975.96 | 28.1 |
| TAM | 288.89 | 8.3 | 144.44 | 4.3 | 398.16 | 11.5 | 431.34 | 12.4 |
| IPA | 1638.44 | 47.4 | 1840.92 | 54.5 | 1669.59 | 48.2 | 1638.44 | 47.1 |
| Water | 556.63 | 16.1 | 278.32 | 8.2 | 398.16 | 11.5 | 431.34 | 12.4 |
| Flux | 3459.92 | 100 | 3380.36 | 100 | 3463.52 | 100 | 3477.08 | 100 |
| Rosin | 975.96 | 77.2 | 1116.68 | 88.5 | 997.61 | 71.5 | 975.96 | 69.3 |
| TAM | 288.89 | 22.8 | 144.44 | 11.5 | 398.16 | 28.5 | 431.34 | 30.7 |
| Active | 1264.85 | 100 | 1261.12 | 100 | 1395.77 | 100 | 1407.30 | 100 |
| IPA | 1638.44 | 74.6 | 1840.92 | 86.9 | 1669.59 | 80.7 | 1638.44 | 79.2 |
| Water | 556.63 | 25.4 | 278.32 | 13.1 | 398.16 | 19.3 | 431.34 | 20.8 |
| Other | 2195.07 | 100 | 2119.24 | 100 | 2067.75 | 100 | 2069.78 | 100 |
| Active | 1264.85 | 36.6 | 1261.12 | 37.3 | 1395.77 | 40.3 | 1407.30 | 40.5 |
| Other | 2195.07 | 63.4 | 2119.24 | 62.7 | 2067.75 | 59.7 | 2069.78 | 59.5 |
| Flux | 3459.92 | 100 | 3380.36 | 100 | 3463.52 | 100 | 2477.08 | 100 |
| | | pts. | | pts. | | pts. | | pts. |
| Rosin | 975.96 | 100 | 1116.68 | 100 | 997.61 | 100 | 975.96 | 100 |
| TAM | 288.89 | 30 | 144.44 | 13 | 398.16 | 40 | 431.34 | 44 |
| IPA | 1638.44 | 168 | 1840.92 | 165 | 1669.59 | 167 | 1638.44 | 168 |
| Water | 556.63 | 57 | 278.32 | 25 | 398.16 | 40 | 431.34 | 44 |
| Sp.G. | .9141 | | .8931 | | .9151 | | .9186 | |
| Volume | 3785 ml | | 3785 ml | | 3785 ml | | 3785 ml | |
| Volume | 1 gal. | | 1 gal. | | 1 gal. | | 1 gal. | |

Table G shows that the fluxes of EXAMPLES 1-4 have about 28-33% rosin, 4-13% TAM, 47-55% IPA and 8-16% water, or 36-41% active and 59-63% other components. At 100 pts rosin, they have about 13-44 pts TAM, 165-168 pts IPA and 25-57 pts water.

These fluxes are used in general metal soldering, e.g., of copper, brass, nickel and tin surfaces, typified in EXAMPLE 5.

EXAMPLE 5—General Metal Soldering

An aluminum backplate (10.35 sq. in. area), provided with two copper slugs (0.47"×0.32"×0.032" strips), was placed on a walking beam (a support) and the flux of EXAMPLE 1 then drop dispensed onto the slugs so that the flux spread over their entire surfaces. The flux was also drop dispensed onto the surfaces of a strip of tin-lead solder (60% Sn - 40% Pb; mp 191°-193° C.) then placed on top of the flux coated slugs. The entire part was then preheated at 180° C. for 86 seconds.

Following preheating, an electroless plated or electroplated nickel substrate on a beryllium oxide substrate, of similar dimensions to the copper slugs, onto which nickel substrate a Darlington transistor had been earlier soldered by die attachment in ambient hydrogen at 400°-440° C., was placed on the flux coated solder on the backplate, and the part heated at 230°-250° C. to cause solder flow and joining of the components, after which cooled. The nickel substrate had a thin oxide layer, and where it was electroless plated nickel, it had a phosphorus oxide layer formed as a hard, tenacious oxide, that required strong fluxing action for proper soldering.

The soldered part was not cleaned in trichlorethylene as is needed to clean excess of the currently used known flux #1 (KESTER 1544, an activated 50% rosin flux of undisclosed proprietary formulation) from the backplate. Experience has shown that such excess of known flux #1 contributes to electrical leakage of the Darlington transistor, yet the EXAMPLE 1 flux left so low a residue that this leakage was reduced to an inconsequential level.

This beneficial result was unexpected, considering the soldering temperature and high amount of diacids in the TAM used to activate the rosin, as shown in Table G, for cleaning and deoxidizing, e.g., of tenaciously held oxide layers on the copper and nickel surfaces, in non-circuit board electrical connection soldering, where splattering is not as important a consideration as with circuit board soldering. While known flux #1 is of higher rosin content than the invention flux, the leakage is clearly not caused by rosin, but by the high ionic residue traceable to the high ionic content in the known flux.

The above soldering procedure was repeated with each of the fluxes of EXAMPLES 2-4, and the same low ionic residue beneficial results were obtained in each case.

EXAMPLE 6—Low rosin Aqueous Alcoholic Flux (a) The above-noted TAM Formulation #3 (BASF) of at least 97% purity, 25-30% succinic acid, 42-47% glutaric acid and 25-30% adipic acid, plus 2-3% total 2,5-pyrrolidinedione and 2,6-piperidinedione, was dissolved in a 60% IPA solution in deionized water in proportions to form an aqueous alcoholic TAM solution of sp.g. 0.9796 (0.2815 g/ml TAM, 0.3764 g/ml IPA and 0.3217 g/ml water, total 0.9796 g/ml), corresponding to 525 g TAM in 1500 ml of the 60% solution of 900 ml or 702 g IPA (0.78×900) and 600 ml or 600 g water, to form 1865 ml TAM solution of 525 g TAM (28.7%), 702 g IPA (38.4%) and 600 g water (32.9%), total 1827 g.

(b) 525 ml of ULTRA-DRY Flux #UD-3040 solution, sp.g. 0.884, totaling 464.1 g (0.884×525), of 40% or 185.64 g (525×0.40) rosin and 60% or 278.46 g (525×0.60) IPA, were combined with 155 ml or 151.83 g (155×0.9796) TAM solution, of 43.63 g (155×0.2815) TAM (28.7%), 58.34 g (155×0.3764) IPA (38.4%) and 49.86 g (155×0.3217) water (32.9%), plus 8782 ml or 6849.90 g (0.78×8782) IPA, to form 9462 ml or 2.5 gal. of flux.

The flux, by calculation contained 185.64 g rosin (2.5%), 43.63 g TAM (0.6%), 7186.70 g (6849.90+278.46+58.34) IPA (96.2%) and 49.86 g water (0.7%), total 7465.89 g of sp.g. 0.7890 (7465.89/9462), for a rosin content of 2.5% corresponding to 2 vol. % (185.64/9462).

(c) The procedures of (a) and (b) were repeated using instead the above-noted TAM Formulation #4 (Rhone-Poulenc), of 18-25% succinic acid, 50-55% glutaric acid and 20-25% adipic acid, plus 1.4% succinic anhydride.

(d) The procedures of (a) and (b) were repeated using instead TAM Formulation #1 (DuPont Canada) of EXAMPLE 1.

EXAMPLE 7—Low Rosin Aqueous Alcholic Flux (a) The procedures of EXAMPLE 6 (a) and (b) were repeated, this time using 560 ml or 495.04 g (0.884×560) of ULTRA-DRY Flux #UD-3040 solution, of 40% or 198.02 g (495.04×0.40) rosin and 60% or 297.02 g (495.04×0.60) IPA, with 165 ml or 161.64 g (165×0.9796) TAM solution, of 46.45 g (165×0.2815) TAM (28.7%), 62.11 g (165×0.3764) IPA (38.4%) and 53.08 g (165×0.3217) water (32.9%), plus 8737 ml or 6814.86 g (0.78×8737) IPA, to form 9462 ml or 2.5 gal. of flux.

The flux, by calculation, contained 198.02 g rosin (2.7%), 46.45 g TAM (0.6%), 7173.99 g (6814.86+297.02+62.11) IPA (96.0%) and 53.08 g water (0.7%), total 7471.54 g of sp.g. 0.7896 (7471.54/9462), for a rosin content of 2.7% corresponding to 2 vol. % (198.02/9462).

(b) The procedure of (a) was repeated using instead TAM Formulation #4 (Rhone-Poulenc) of EXAMPLE 6 (c).

(c) The procedure of (a) was repeated using instead TAM Formulation #1 (DuPont Canada) of EXAMPLE 1.

EXAMPLE 8—Low Rosin Aqueous Alcoholic Flux (a) The procedures of EXAMPLE 6 (a) and (b) were repeated, this time using 425 ml or 375.7 g (0.884×425) of ULTRA-DRY Flux #UD-3040 solution, of 40% or 150.28 g (375.7×40) rosin and 60% or 225.42 g (375.7×0.60) IPA, with 65 ml or 63.68 g (65×0.9796) TAM solution, of 18.30 g (65×0.2815) TAM (28.7%), 24.47 g (65×0.3764) IPA (38.4%) and 20.91 g (65×0.3217) water (32.9%), plus 3295 ml or 2570.1 g (0.78×3295) IPA, to form 3785 ml or 1 gal. of flux.

The flux, by calculation, contained 150.28 g rosin (5.0%), 18.30 g TAM (0.6%), 2819.99 g (2570.1+225.42+24.47) IPA (93.7%) and 20.91 g water (0.7%), total 3009.48 g of sp.g. 0.7951 (3009.48/3785), for a rosin content of 5.0% corresponding to 4 vol. % (150.28/3785).

(b) The procedure of (a) was repeated using instead TAM Formulation #4 (Rhone-Poulenc) of EXAMPLE 6 (c).

(c) The procedure of (a) was repeated using instead TAM Formulation #1 (DuPont Canada) of EXAMPLE 1.

Table H shows the proportions (gms, % and parts) of the ingredients in the low rosin content fluxes of Examples 6-8.

TABLE H
Low Rosin Fluxes of the Invention

|  | Ex. 6 Grams | Wt. % | Ex. 7 Grams | Wt. % | Ex. 8 Grams | Wt. % |
|---|---|---|---|---|---|---|
| Rosin | 185.64 | 2.5 | 198.02 | 2.7 | 150.28 | 5.0 |
| TAM | 43.63 | 0.6 | 46.45 | 0.6 | 18.30 | 0.6 |
| IPA | 7186.70 | 96.2 | 7173.99 | 96.0 | 2819.99 | 93.7 |
| Water | 49.86 | 0.7 | 53.08 | 0.7 | 20.91 | 0.7 |
| Flux | 7465.83 | 100 | 7471.54 | 100 | 3009.48 | 100 |
| Rosin | 185.64 | 81.0 | 198.02 | 81.0 | 150.28 | 89.1 |
| TAM | 43.63 | 19.0 | 46.45 | 19.0 | 18.30 | 10.9 |
| Active | 229.27 | 100 | 244.47 | 100 | 168.58 | 100 |
| IPA | 7186.70 | 99.3 | 7173.99 | 99.3 | 2819.99 | 99.3 |
| Water | 49.86 | 0.7 | 53.08 | 0.7 | 20.91 | 0.7 |
| Other | 7236.56 | 100 | 7227.07 | 100 | 2840.90 | 100 |
| Active | 229.27 | 3.1 | 244.47 | 3.3 | 168.58 | 5.6 |
| Other | 7236.56 | 96.9 | 7227.07 | 96.7 | 2840.90 | 94.4 |
| Flux | 7465.83 | 100 | 7471.54 | 100 | 3009.48 | 100 |
|  |  | pts. |  | pts. |  | pts. |
| Rosin | 185.64 | 100 | 198.02 | 100 | 150.28 | 100 |
| TAM | 43.63 | 24 | 46.45 | 23 | 18.30 | 12 |
| IPA | 7186.70 | 3871 | 7173.99 | 3623 | 2819.99 | 1876 |
| Water | 49.86 | 27 | 53.08 | 27 | 20.91 | 14 |
| Sp.G. | .7890 |  | .7896 |  | .7951 |  |
| Volume | 9462 | ml | 9462 | ml | 3785 | ml |
| Volume | 2.5 | gal. | 2.5 | gal. | 1 | gal. |

Table H shows that the fluxes of EXAMPLES 6-8 have about 2.5-%rosin, 0.6% TAM, 93-96% IPA and 0.7% water, or 3-6% active and 94-97% other components. At 100 pts rosin, they have about 12-24 pts TAM, 1876-3871 pts IPA and 14-27 pts water.

These fluxes are used in foam or wave soldering of electronic circuit board components, typified in EXAMPLE 11.

EXAMPLE 9—Low Rosin Water-Free Alcoholic Flux (a) TAM Formulation #3 (BASF) of EXAMPLE 6 (a) was used directly by dissolving 15 g thereof in 560 ml or 495.04 g (0.884×560) of ULTRA-DRY Flux #UD-3040 solution, of 40% or 198.02 g (495.04×0.40) rosin and 60% or 297.02 g (495.04×0.6) IPA, plus 3533 ml or 2755.74 g (0.78×3533) IPA, to form 3785 ml or 1 gal. of water-free flux.

The flux, by calculation, contained 198.02 g rosin (6.1%), 15 g TAM (0.5%) and 3052.76 g (2755.74+97.02) IPA (93.4%), total 3265.78 g of sp.g. 0.8628 (3265.78/3785), for a rosin content of 6.1% corresponding to 5 vol. % (198.02/3785).

(b) The procedure of (a) was repeated using instead TAM Formulation #4 (Rhone-Poulenc) of EXAMPLE 6 (c).

(c) The procedure of (a) was repeated using instead TAM Formulation #1 (DuPont Canada) of EXAMPLE 1.

EXAMPLE 10—Low Rosin Water-Free Alcoholic Flux (a) TAM Formulation #3 (BASF) of EXAMPLE 6 (a) was used directly with commercially obtained water-white rosin, by dissolving 10.98 g TAM in 65 ml IPA and 56.78 g water-white rosin in about 200 ml IPA, combining these two solutions and adding additional IPA to a final water-free alcoholic solution volume of 3785 ml or 1 gal.

The flux, by calculation, contained 56.78 g rosin (1.9%), 10.98 g TAM (0.4%) and 2932.02 g IPA (97.7%), total 2999.78 g of sp.g 0.7925 (2999.78/3785), at a rosin content of 1.9% corresponding to 1.5 vol. % (56.78/3785).

(b) The procedure of (a) was repeated using instead TAM Formulation #4 (Rhone-Poulenc) of EXAMPLE 6 (c).

(c) The procedure of (a) was repeated using instead TAM Formulation #1 (DuPont Canada) of EXAMPLE 1.

Table I shows the proportions (gms, % and parts) of the ingredients in the fluxes of Examples 9-10.

TABLE I

Low Rosin Water-Free Fluxes of the Invention

|  | Ex. 9 Grams | Wt. % | Ex. 10 Grams | Wt. % |
|---|---|---|---|---|
| Rosin | 198.02 | 6.1 | 56.78 | 1.9 |
| TAM | 15.00 | 0.5 | 10.98 | 0.4 |
| IPA | 3052.76 | 93.4 | 2932.02 | 97.7 |
| Flux | 3265.78 | 100 | 2999.78 | 100 |
| Rosin | 198.02 | 93.0 | 56.78 | 83.8 |
| TAM | 15.00 | 7.0 | 10.98 | 16.2 |
| Active | 213.02 | 100 | 67.76 | 100 |
| Active | 213.02 | 6.5 | 67.76 | 2.3 |
| Other | 3052.76 | 93.5 | 2932.02 | 97.7 |
| Flux | 3265.78 | 100 | 2999.78 | 100 |
|  |  | pts. |  | pts. |
| Rosin | 198.02 | 100 | 56.78 | 100 |
| TAM | 15.00 | 8 | 10.98 | 19 |
| IPA | 3052.76 | 1542 | 2932.02 | 5164 |
| Sp.G. | .8628 |  | .7925 |  |
| Volume | 3875 ml |  | 3875 ml |  |
| Volume | 1 gal. |  | 1 gal. |  |

Table I shows that the fluxes of EXAMPLES 9-10 have about 2-6% rosin, 0.4-0.5% TAM and 93-98% IPA, or 2-7% active and 93-98% other components. At 100 pts rosin, they have about 8-19 pts TAM and 1542-5164 pts IPA.

The flux of EXAMPLE 9 is used by foam or wave application, and that of EXAMPLE 10 by spray application, in soldering circuit board components, typified in EXAMPLE 11. When used by spray application, the rosin content is more dilute, e.g., at most, about 1-2% rosin (1-2 g/100 ml), to form a fine mist.

EXAMPLE 11

Each of the three TAM based fluxes (BASF, Rhone-Poulenc and DuPont Canada) of each of EXAMPLES 6-10 was individually used in an electronic circuit board with pre-tin lead plated through holes and components, by foam or wave application (fluxes of EXAMPLES 6-9) or spray application (fluxes of EXAMPLE 10), soldered at 250°-260° C. with a solder of a eutectic tin-lead 63% Sn -37% Pb composition (mp 183° C.), or of a tin-lead 60% Sn - 40% Pb composition (mp 191°-193° C.). In each case, the three-acid mixture did not sublime and condense on the board, and a hotter than usual ambient condition was not needed to avoid this problem.

Each of the fluxes of EXAMPLES 6-10 showed a significant improvement in solderability, providing an increased production yield per a reduced number of voids and shorts, compared to the currently used known flux #2 (LONCO RF 710, an activated 5% rosin flux of undisclosed proprietary formulation, London Chemical Co., Bensenville, Ill.). The surface insulating property was deemed excellent, allowing the soldered circuit boards to be conformal coated (conventional protective coating) directly, without washing to remove ionic residue, and prior to the usual reliability tests, whereas normally conformal coating is only performed after the boards have been cleaned with Freon TMS and have passed given reliability tests.

These beneficial results were unexpected, even though the 5% rosin content known flux #2 has a higher rosin content than the roughly 3% rosin content EXAMPLE 6-7 fluxes, because the same beneficial results also occurred with the 5% rosin content EXAMPLE 8 fluxes and the 6.1% rosin content EXAMPLE 9 fluxes, confirming that the problem is not caused by the rosin content, but by the high ionic residue left at the soldering site, which is traceable to the high ionic content in the known flux.

The presence of water is not critical as it boils off during soldering, and may be added to reduce solvent, e.g., IPA, cost and aid foaming without adding a foaming agent, in up to a minor amount of the total liquid in the high rosin content fluxes of EXAMPLES 1-4, as noted in Table G, for general metal soldering (EXAMPLE 5) where splattering is not a major problem. In the low rosin content fluxes of EXAMPLES 6-10 for circuit board soldering (EXAMPLE 11), water is present in only a slight amount, as noted in Tables H and I, to avoid this problem.

While a higher TAM content is used to activate the higher rosin content fluxes for stronger cleaning in general metal soldering, a lower TAM content is used in the lower rosin content fluxes for milder cleaning in circuit board soldering.

Production Line Test Run

Circuit boards designated Parts #1-4 were soldered per EXAMPLE 11 with 3% rosin content flux of EXAMPLE 7 (c) [TAM Formulation #1 (DuPont Canada) of EXAMPLE 1] on a wave soldering production line in a three-day test run, with a comparison run of Parts #1-4 soldered with known flux #2 (LONCO RF 710).

Table J shows pertinent specific gravity data of the run:

TABLE J

Specific Gravity of Invention Flux
Three-Day Test Run - 3% Rosin Flux
Wave Soldering Line - Entire Day Shift

| Control Point | Reading | Time |
| --- | --- | --- |
| Day 1 - Sp.G. Set Point | .810 | 0:00 hr - Start of Test Run |
| Sp.G. Reading | .815 | 8:30 hr - End of Test Run |
| Day 2 - Sp.G. Set Point | .810 | 0:00 hr - Start of Test Run |
| Sp.G. Reading | .816 | 8:50 hr - End of Test Run |
| Day 3 - Sp.G. Set Point | .810 | 0:00 hr - Start of Test Run |
| Sp.G. Reading | .811 | 9:40 hr - End of Test Run |

Table K shows pertinent flux and makeup isopropyl alcohol usage and rejection rate comparison data of the run.

TABLE K

Usage of Invention Flux and Reject Rate Comparison
Three-Day Test Run - 3% Rosin Flux
Wave Soldering Line - Entire Day Shift

|  |  | Usage | | | Reject Rate Comparison (Averaged ppm) | |
| --- | --- | --- | --- | --- | --- | --- |
|  |  | Flux | | IPA | Invention | Known |
|  | Part | Start Gals. | Added Gals. | Added Gals. | Flux ppm (%) | Flux #2 ppm (%) |
| Day - 1 | #1 | 2.75 | 0 | 1 | 0 (None) | 1000 (0.10) |
|  | #2 | — | 0 | 1 | 1500 (0.15) | 2375 (0.24) |
|  | #3 | — | 0 | 1 | 1000 (0.10) | 2250 (0.23) |
| Day - 2 | #1 | — | 1 | 3 | 666 (0.07) | 1000 (0.10) |
| Day - 3 | #2 | 2.75 | 0 | 2* | 500 (0.05) | 2375 (0.23) |
|  | #4 | — | 0 | 2* | Not Available | |
| Totals | | 5.5 | 1 | 10 | 3666 (0.37) | 9000 (0.90) |
| Mean | | | | | 733 (0.07) | 1800 (0.18) |

*High humidity - hot day, higher evaporation rate.

The data in Tables J and K typify consumption of the 3% rosin content flux of the invention under wave solder production line conditions over a three-day period of 8:30 to 9:40 hour/day plant shifts, formed of two consecutive days (Days 1 and 2) and a third day (Day 3) after a temporary, unrelated, interruption of three intervening days.

A titration test was performed at the end of each day to determine the rosin content of the flux in the wave soldering machine used, and it was indicated to be at the required level, consistent with the Table J specific gravity readings.

Table K shows that the total flux usage was 6.5 gals. plus 10 gals. isopropyl alcohol added to make up evaporation losses. The line was serviced with 2.75 gal. amounts twice for two separate start-ups (Days 1 and 3), and these lasted for the entire shift without requiring further flux, while only one addition of 1 gal. of flux was required on the intermediate day (Day 2) to that remaining from the previous day (Day 1).

Isopropyl alcohol was added periodically to the flux to maintain the required low rosin concentration. A small amount of the flux thickened when left uncovered for more than 24 hours, but was made fully usable again by remixing or adding makeup amounts of isopropyl alcohol. Also, high humidity weather conditions caused loss of isopropyl alcohol from the flux at a higher than normal evaporation rate.

As to odor, the invention flux had a pleasant smell as noticed when pouring it into the wave soldering machine tank, and when it came into contact with the molten solder during soldering, there was no vulgar or offensive smell as occurred with known flux #2 in the comparison runs. As to solderability, visual inspection of boards indicated an enhanced cosmetic appearance to the solder joints per the invention flux that did not occur with known flux #2. The invention flux improved soldering characteristics as shown by reduced bridging and voids compared to known flux #2. This improvement in characteristics was coupled with a reduction in the amount of touch-up required on the boards compared to that with known flux #2.

The invention flux led to a higher soldered product yield per shift than with known flux #2, as shown by the parts per million (ppm) rejection rate data in Table K. No Parts #1 soldered with the invention flux were rejected on Day 1 compared to a 0.10% reject rate for known flux #2, while the rate for Parts #2 was 0.15% for the invention flux compared to 0.24% for known flux #2, and for Parts #3 was 0.10% compared to 0.23% for known flux #2. On Day 2, for Parts #1 it was 0.07% for the invention flux compared to 0.10% for known flux #2. On Day 3, for Parts #2 it was 0.05% for the invention flux compared to 0.23% for known flux #2, and while the Parts #4 rates are not available, they presumably follow the other data.

Statistically, the five separate ppm rejection rate values for the invention flux total 3666 ppm or 0.37%, averaging 733 ppm or 0.07%, while those for known flux #2 total 9000 ppm or 0.90%, averaging 1800 ppm or 0.18%. Thus, the invention flux resulted in a reduction of the rejection rate by much more than half that of the known flux, and in one instance (Day 1, Part #1) the invention flux unexpectedly afforded a production line product at 100% acceptability or at zero rejection rate.

Product Reliability Tests

Twenty completed printed circuit board assemblies or mainboards, i.e., attached to keyboard and display driver board components of the intended final unit, produced during the three-day test run using the 3% rosin content flux of the invention were subjected to product reliability tests. These twenty mainboards were not washed with cleaning liquid to remove soldering flux residue before being conformal coated.

All such mainboards were directly conformal coated by a conventional step in production line soldering of the boards to protect their electrical components from ambient moisture and the like. Normally, washing is required before conformal coating to remove flux residue to minimize defects from developing in use of the boards, even though they have a moisture protective conformal coating as an added precaution.

Fifteen of these mainboard units were subjected to the following conventional tests:
  (1) 500 hours Power-Temperature Cycle, with an applied voltage of 14 volts, at −40° to +85° C., and 5 minutes cycle time, and then
  (2) 168 hours Bias High Voltage Humidity, at 11 volts bias, 65° C. and 95% relative humidity (rel. hum.)
  Nine of these fifteen mainboard units were
subjected to the following conventional test, along with the remaining five untested mainboard units as controls:
  (3) Moisture Susceptibility, at −40° C. for 2 hours, and then at 65° C. and 95% rel. hum. for 2 minutes, after which the unit is powered for 5 minutes to verify that it is operational.

All the mainboards performed satisfactorily in these reliability tests, and it was determined that the solderability of the invention flux was excellent. There was a significant improvement in solderability and increase in yield per a reduction in the number of voids and shorts, compared to known flux #2. The surface insulating property of the invention flux was found to be excellent, allowing the boards to be directly conformal coated without washing and before being subjected to the reliability tests that usually precede conformal coating.

Total Ionics and Extracted Anions Cleanliness Tests

Three circuit boards (boards 1-3), soldered using the 3% rosin flux [TAM Formulation #1 (DuPont Canada)], were subjected to successive (a) and (b) cleanliness tests to determine ionic residue levels:

(a) first with total ionics measurement being performed using an Ionic Contamination Test System Omega Meter (Kenco Industries Inc.), and (b) thereafter with total extracted anions measurement, i.e., including weak organic acid residue plus background anion residue of extraneous ions such as bromine and chlorine ions from the board itself, being performed using an ion chromatograph, Dionex Ion Chromatograph Model 4000I CMA-3 (Dionex Co.), in each case without washing and before conformal coating.

Five additional circuit boards (boards 4-8), soldered in the same manner using that 3% rosin flux, were subjected to these tests before applying the conformal coating but, in this case, while the tests were performed on the first two boards (boards 4-5) without washing, the last three (boards 6-8) were washed with Freon TMS to remove ionic residue.

Four further circuit boards (boards 9-12), soldered in the same manner using known 5% rosin flux, i.e., known flux #2 (LONCO RF 710) for three boards (boards 9-11) and a further known flux #3 (HI-GRADE 3565D, an activated 5% rosin flux of undisclosed proprietary formulation, High-Grade Alloy Corp., East Hazelcrest, Ill.) for the fourth board (board 12), were also tested before conformal coating, with the tests being performed on the first two boards (boards 9-10) without washing and on the second two (boards 11-12) after washing with Freon TMS.

Moreover, five additional boards (boards 13-17), soldered in the same manner using known flux #2, and five additional boards (boards 18-22), soldered in the same manner using known flux #3, were also tested after washing with Freon TMS but before conformal coating, and their averaged total extracted anionic residue values, respectively, were calculated.

All boards (boards 1-22) were of the same size, having a total area of 230 cm$^2$ (total of both sides of the board), such that the $\mu$g/cm$^2$ values are based on that 230 cm$^2$ board area.

The (a) Omega Meter tests were carried out by immersing the entire board in a solvent mixture of 75% isopropyl alcohol (IPA) and 25% deionized water at room temperature, and subjecting the board to continuous measurement for about 6 minutes at room temperature, according to a common standard procedure.

The (b) ion chromatograph tests for total anions were carried out according to a special extraction procedure in which the board was extracted with 200 ml of a solvent mixture of 75% IPA and 25% deionized water for 1 hour at 80° C., to form an extract concentrate of attendant anions in about 40 ml residual IPA-water mixture (mainly water as the 80° C. temperature promotes IPA volatilization). The extraction causes uptake into the concentrate of weak organic acid from the flux residue, plus mainly bromine and chlorine ions from constituents of the board, for measurement of total extracted anions.

This procedure is performed by placing the board in a commercially obtained Kapak/Scotch Pak heat sealable pouch (Kapak Corp., Minneapolis, Minn.), and sealing the pouch for the extraction procedure, so that during extraction the volatiles boiling off at the 80° C. ambient temperature are evacuated from the sealed pouch. The extract concentrate is subjected to standard chemical analysis of all anions, including those of organic acids traceable to the flux, in the ion chromatograph.

Although the (a) Omega Meter tests measure total ionics traceable to the flux constituents by a rapid (6 minute) test procedure, while the (b) ion chromatograph tests measure total anions from all attendant sources by a prolonged (1 hour) intensive extraction procedure, the levels of ionic residue in both measurement procedures (a) and (b) are in the same units of $\mu$g/cm$^2$. However, the (a) Omega Meter units are in terms of the NaCl equivalent thereof, as the Omega Meter was calibrated with a standard known concentration of NaCl, while the (b) ion chromatograph units are direct measures of extracted anionic content per ion chromatograph measurement.

Table L shows the unexpected results obtained in these cleanliness tests, for all of these 230cm$^2$ area boards, (a) with the total ionic residue expressed in micrograms per square centimeter, as sodium chloride equivalent (Omega Meter), and (b) with the total extracted anionic residue expressed in micrograms per square centimeter (ion chromatograph):

TABLE L

| | Cleanliness Testing | | |
|---|---|---|---|
| | (a) Omega Meter Total Ionics Ionic Residue $\mu$g/cm$^2$ - As NaCl | (b) Ion Chromatograph Total Extracted Anions Anionic Residue | |
| Board | Equivalent | $\mu$g/cm$^2$ | Condition |
| Invention | | | |
| 1 | 2.446 | 21.558* | Unwashed |
| 2 | 2.668 | 21.558* | Unwashed |
| 3 | 2.752 | 21.558* | Unwashed |
| 4 | 4.116 | 39.172 | Unwashed |
| 5 | 3.727 | 33.753 | Unwashed |
| 6 | 2.231 | 30.434 | Washed |
| 7 | 2.011 | 20.669 | Washed |
| 8 | 2.512 | 20.214 | Washed |
| Flux #2 | | | |
| 9 | 4.623 | 105.263 | Unwashed |
| 10 | 4.513 | 111.513 | Unwashed |
| 11 | 8.101 | 68.281 | Washed |
| Flux #3 | | | |
| 12 | 8.413 | 24.637 | Washed |
| Flux #2 | | | |
| 13-17 | — | 40.63** | Washed |
| Flux #3 | | | |
| 18-22 | — | 52.16** | Washed |

*Boards 1-3: 64.674 $\mu$g/cm$^2$ total anions; 21.558 $\mu$g/cm$^2$ average per board.
**Averaged value for five boards.

The (a) Omega Meter total ionics results show that washing the boards to remove ionic residue traceable to the flux constituents is superfluous for the invention flux as very low ionic residues, all below a 5 $\mu$g/cm$^2$ (NaCl equivalent trace amount, and mainly below 3 $\mu$g/cm$^2$, are obtained without washing (boards 1-5), and that washing only slightly further 6-8).

On the other hand, per the (a) tests, washing the circuit board (board 11) soldered with the known flux #2 appears to increase the ionic residue level compared to the unwashed boards (boards 9–10), and the similar high level of the washed board (board 12) soldered with the known flux #3 is consistent with this conclusion. This increase in ionic residue level on washing must be due to the undisclosed high ionic content in the fluxes #2 and #3, since rosin is not ionic and cannot alone explain this increase in ionic level on washing (cf. the explained results obtained in EXAMPLES 5 and 11)

The (b) ion chromatograph test results show similar differences among the boards, the values being higher than those of the (a) tests, as the (b) tests measure total anion levels from all attendant sources, including the board itself, and are based on a vigorous extraction of anionic constituents that would not necessarily cause corrosion in unextracted state.

As to the boards soldered with the invention flux, per the (b) tests, the total extracted anionics levels of the washed boards (boards 6–8), roughly 20–30 $\mu g/cm^2$, compared to the unwashed boards (boards 1–5), roughly 22–39 $\mu g/cm^2$, confirm that washing the boards is superfluous for the invention flux.

As to the boards soldered with the known fluxes #2 and #3, per the (b) tests, the lower total extracted anionics levels of the twelve washed boards (boards 11–22), roughly 25–68 $\mu g/cm^2$, compared to the higher levels of the two unwashed boards (boards 9–10), roughly 105–112 $\mu g/cm^2$, is no doubt due to the vigorous extraction used for the (b) tests. These (b) tests may be regarded as mimicking more pronouncedly the extractive action per the (a) tests of the Freon TMS washing liquid in reaching ionic constituents in any attendant rosin residue serving as retaining matrix for such ionic constituents of the highly acidic known fluxes #2 and #3 on the washed boards (boards 11–12), compared to the unwashed boards (boards 9–10).

Thus, a plausible explanation of the role of the rosin is that any content thereof in the flux residue remaining after soldering acts as a matrix which retains ionic constituents in direct proportion to the initial concentration of such constituents in the flux, and in direct relation to the capability (i.e., relative ease or difficulty) or incapability of such ionic constituents to volatilize during the heat soldering operation. This matrix retention explanation as to the differences in results in using the invention flux compared to known fluxes #2 and #3, as shown in Table L, is consistent with the differences in results in using in the invention flux compared to known fluxes #1 and #2 per EXAMPLES 5 and 11.

In any case, per the (b) tests, the total extracted anionics levels of the unwashed boards soldered with the invention flux (boards 1–5) are markedly below the levels of the unwashed boards soldered with the known flux #2 (boards 9–10), and the total extracted anionics levels of the washed boards soldered with the invention flux (boards 6–8) are markedly below the levels of the washed boards soldered with the known fluxes #2 and #3 (boards 11 and 13–22), with one exception (board 6 compared to board 12). Nevertheless, as to all (b) test values, those of the unwashed boards soldered with the invention flux (boards 1–5) are sufficiently low in anionic residue to obviate the need for a washing step.

EXAMPLE 12—Low TAM Rosin-Free and Water-Free Alcoholic Flux (a) TAM Formulation #3 (BASF) of EXAMPLE 6 (a) is used directly with IPA to form a low TAM content rosin-free and water-free flux for spray application, (i) by dissolving 5 g TAM in 995 g IPA to form an isopropyl alcohol solution of about 0.5% TAM content, and (ii) by dissolving 10 g TAM in 990 g IPA to form an isopropyl alcohol solution of about 1% TAM content.

(b) The procedure of (a) is repeated using instead TAM Formulation #4 (Rhone-Poulenc) of EXAMPLE 6 (c).

(c) The procedure of (a) is repeated using instead TAM Formulation #1 (DuPont) of EXAMPLE 1.

Each of the fluxes of EXAMPLE 12 is usable according to EXAMPLE 11 like the flux of EXAMPLE 10 by spray application to the circuit board for attaining similar results, the TAM in this case serving as flux sufficiently to clean the surfaces being soldered due to the highly acidic nature of the three acids present, yet of sufficiently dilute concentration to avoid undue corrosive action while leaving a low ionic residue.

EXAMPLE 13—Low TAM Rosin-Free Aqueous Alcoholic Flux 7 ml of the above-noted "DBE" solvent (DuPont Co.) liquid (DBE) of bp 196°–225° C. and sp.g. 1.092 (20° C.), containing 99.5% total ester content (min.), of about 16.5% dimethyl succinate, 66% dimethyl glutarate and 17% dimethyl adipate, plus about 0.2% methanol, 0.1% water (max.) and less than 10 ppm hydrogen cyanide, totaling 7.644 g (1.092×7) DBE, were combined with 3 ml or 2.9388 g (3×0.9796) TAM solution [Formulation #3 (BASF)] prepared in EXAMPLE 6 (a), of 0.8445 g (3×0.2815) TAM (28.7%), 1.1292 g (3×0.3764) IPA (38.4%) and 0.9651 g (3×0.3217) water (32.9%), plus 340 ml or 265.2 g (0.78×340) IPA, to form 350 ml or 0.09 gal. of flux.

The flux, by calculation, contained 0.8445 g TAM (0.3%), 7.6440 g DBE (2.8%), 266.3292 g (265.2+1.1292) IPA (96.6%) and 0.9651 g water (0.3%), total 275.7828 g of sp.g. 0.7880 (275.7828/350), for a TAM content of 0.3% corresponding to 0.2 vol. % (0.8445/350).

EXAMPLE 14—Low TAM Rosin-Free Aqueous Alcoholic Flux

The procedure of EXAMPLE 13 was repeated, this time using 125 ml or 136.5 g (1.092×125) DBE with 50 ml or 48.980 g (50×0.9796) TAM solution, of 14.075 g (50×0.2815) TAM (28.7%), 18.820 g (50×0.3764) IPA (38.4%) and 16.085 g (50×0.3217) water (32.9%), plus 3610 ml or 2815.8 g (0.78×3610) IPA, to form 3785 ml or 1 gal. of flux.

The flux, by calculation, contained 145.075 g TAM (0.5%), 136.5 g DBE (4.6%), 2834.62 g (2815.8+18.82) IPA (94.4%) and 16.085 g water (0.5%), total 3001.28 g of sp.g 0.7929 (3001.28/3785), for a TAM content of 0.5% corresponding to 0.4 vol. % (14.075/3785).

At 100 pts TAM, the EXAMPLE 13 flux had about 905 pts DBE, 31537 pts IPA and 114 pts water, and the EXAMPLE 14 flux had about 970 pts DBE, 20139 pts IPA and 114 pts water.

Rosin-free low TAM content fluxes of EXAMPLES 13–14 were used in wave soldering electronic circuit board components as in EXAMPLE 11.

When subjected tot he above (a) Omega Meter tests without washing to remove ionic residue and before applying the conformal coating, a circuit board (board 23) soldered using the EXAMPLE 13 rosin-free flux had anionic residue of 1.02128 $\mu g/cm^2$, as NaCl equivalent, while one (board 24) soldered using the EXAMPLE 14 rosin-free flux had ionic residue of 1.1597 $\mu g/cm^2$, as NaCl equivalent, both of which are surprisingly below 1.2 $\mu g/cm^2$, and well below the rosin flux (a) test ionic residues of the washed boards 6-8 of Table L.

When thereafter subjected tot he above(b) ion chromatograph tests, the board (board 23) soldered using the EXAMPLE 13 rosin-free flux had a total extracted anionics residue of 6.1559 $\mu g/cm^2$, while that (board 24) soldered using the EXAMPLE 14 rosin-free flux had a total extracted anionics residue of 12.2705 $\mu g/cm^2$, both of which are also surprisingly well below the rosin flux (b) test total extracted anionics residues of all the boards 1-22 of Table L.

Boards 23-24, like boards 1-22 of Table L, were of the same size, each having a total area of 230 $cm^2$ (total of both sides of the board).

These markedly improved low ionic (and extracted anionic) residue results for the rosin-free flux of the invention (boards 23-24), compared to those for the rosin flux of the invention (boards 1-8), and more pointedly compared to those for the known rosin fluxes #2 and #3 (boards 9-22), are consistent with the above explanation that the (a) test detected increase in ionic residue of the Freon TMS washed boards soldered with known fluxes #2 and #3 (boards 11-12), compared to the levels of the unwashed boards soldered with known flux #2 (boards 9-10), is traceable to a residual amount of rosin that serves as an acidic constituent-retaining matrix.

This is emphasized by the analogous results per the (b) tests as to total extracted anions, since the rosin-free flux lacks such a potential acidic constituent-retaining matrix and its (b) test residue levels are far below the concordant total extracted anionic levels for all the rosin fluxes of Table L.

Because of its lack of any rosin, the rosin-free flux is particularly suitable, not only to avoid problems associated with the ionic constituent-retaining matrix functioning of rosin, but also to avoid problems associated with circuit board soldering in those instances when the presence of even a slight residue of rosin could cause difficulties in achieving efficient electrical contact between certain mechanical switch contact surfaces, as earlier explained.

Accordingly, it can be appreciated that the specific embodiments described are merely illustrative of the general principles of the invention. Various modifications may be provided consistent with the principles set forth.

The embodiments of the invention in which an exclusive property or privilege is claimed are defined as follows:

1. Low residue soldering flux comprising rosin and an activating amount of an essentially non-subliming dibasic acid mixture containing by weight about 15-30% succinic acid, 40-63% glutaric acid and 10-30% adipic acid.

2. The flux of claim 1 wherein the dibasic acid mixture has a boiling point of about 150°-210° C.

3. The flux of claim 1 wherein the rosin and dibasic acid mixture are in the relative proportion to each other by weight of about 65-95% rosin and 5-35% dibasic acid mixture.

4. The flux of claim 1 including a volatilizable flux vehicle.

5. The flux of claim 4 wherein by weight the rosin and dibasic acid mixture are in a combined amount of about 1.25-55% and the vehicle is in an amount of about 45-98.75%.

6. The flux of claim 5 wherein the rosin and dibasic acid mixture are in the relative proportion to each other by weight of about 65-95% rosin and 5-35% dibasic acid mixture.

7. The flux of claim 4 wherein the vehicle comprises by weight about 70-100% of a volatile organic solvent and 0-30% deionized water.

8. The flux of claim 7 wherein the solvent is selected from the group consisting of aliphatic or cycloaliphatic alcohol, an aliphatic carboxylic acid ester, a cyclic ketone, and mixtures thereof.

9. The flux of claim 8 wherein the solvent is a lower aliphatic alcohol.

10. The flux of claim 8 containing a minor diluent amount of deionized water.

11. The flux of claim 10 wherein the solvent and water are int he relative proportion to each other by weight of about 70-99.5% solvent and 0.5-30% deionized water.

12. The flux of claim 11 wherein the solvent is isopropyl alcohol.

13. Low residue soldering flux consisting essentially of by weight about 1-35% rosin; 0.25-20% of an essentially non-subliming dibasic acid mixture containing about 15-30% succinic acid, 40-63% glutaric acid and 10-30% adipic acid; 45-98.75% of a volatilizable organic solvent; and 0-20% deionized water; said percentage s of rosin, dibasic acid mixture, solvent and water being based on the total flux, and said percentages of succinic, glutaric and adipic acids being based on the total dibasic acid mixture, the dibasic acid mixture having a boiling point of about 150°-210° C.

14. The flux of claim 13 containing by weight about 25-35% rosin, 2.5-20% dibasic acid mixture, 45-60% solvent and 5-20% deionized water.

15. The flux of claim 14 wherein the solvent is isopropyl alcohol.

16. The flux of claim 13 containing by weight about 1-8% rosin, 0.25-1% dibasic acid mixture, 90-98.75% solvent and 0-'% deionized water.

17. The flux of claim 16 wherein the solvent is isopropyl alcohol.

18. The flux of claim 16 wherein the flux is essentially water-free.

19. The flux of claim 18 wherein the solvent is isopropyl alcohol.

20. Low residue soldering flux comprising a rosin-free, essentially non-subliming dibasic acid mixture of succinic, glutaric and adipic acids having a boiling point of about 150°-210° C. in sufficiently dilute solution in a volatilizable organic solvent to be capable of essentially completely volatilizing during heat soldering to leave the soldering site essentially free from ionic residue.

21. The flux of claim 20 wherein the dibasic acid mixture contains by weight about 15-30% succinic acid, 40-63% glutaric acid and 10-30% adipic acid.

22. The flux of claim 20 wherein the solvent is selected form the group consisting of an aliphatic or cycloaliphatic alcohol, an aliphatic carboxylic acid ester, and mixtures thereof.

23. The flux of claim 20 containing a slight diluent amount of deionized water.

24. The flux of claim 20 wherein the dibasic acid mixture is present in an amount by weight of less than about 10% of the flux.

25. Low residue soldering flux comprising a rosin-free solution of by weight about 0.21-1% of an essentially non-subliming dibasic acid mixture containing about 15-30% succinic acid, 40-63% glutaric acid and 10-30% adipic acid, and 99-99.8% of a volatilizable solvent selected from the group consisting of aliphatic or cycloaliphatic alcohol, an aliphatic carboxylic acid ester, and mixtures thereof.

26. The flux of claim 25 containing a slight diluent amount of deionized water.

27. The flux of claim 25 consisting essentially of by weight about 0.5-1% dibasic acid mixture and 99-99.5% lower aliphatic alcohol.

28. The flux of claim 27 wherein the alcohol is isopropyl alcohol.

29. The flux of claim 25 consisting essentially of by weight about 0.2-1% dibasic acid mixture, 2-10% aliphatic dicarboxylic acid dilower alkyl ester, 88-97.6% lower aliphatic alcohol and 0.2-1% deionized water.

30. The flux of claim 29 wherein the ester is a mixture of by weight about 10-20% dilower alkyl succinate, 60-70% dilower alkyl glutarate and 10-20% dilower alkyl adipate.

31. The flux of claim 29 wherein the ester is a mixture of by weight about 16.5% dimethyl succinate, 66% dimethyl glutarate and 17% dimethyl adipate, having a boiling point of about 196°-225° C., and the alcohol is isopropyl alcohol.

32. A method of heat soldering metal surfaces, comprising applying a solder to the metal surfaces in the presence of an effective amount of the flux of claim 1 in coating disposition on the metal surfaces, and at a temperature sufficient for molten flow of the solder and for volatilization of the flux to leave the site essentially free from ionic residue.

33. The method of claim 32 wherein the soldering is effected at about 200°-500° C.

34. The method of claim 32 wherein the soldering is effected with a tin-lead solder.

35. The method of claim 32 wherein the flux includes a volatilizable flux vehicle, and soldering is at a temperature sufficient to leave at most a trace amount of ionic residue.

36. A method of heat soldering metal surfaces, comprising applying a solder to the metal surfaces in the presence of an effective amount of the flux of claim 14 in coating disposition on the metal surfaces, and at a temperature sufficient for molten flow of the solder and for volatilization of the flux to leave the site essentially free from ionic residue.

37. A method of heat soldering metal surfaces comprising applying a solder to the metal surface in the presence of an effective amount of the flux of claim 16 in coating disposition on the metal surfaces, and at a temperature sufficient for molten flow of the solder and for volatilization of the flux to leave an ionic residue of at most about 5 $\mu g/cm^2$ equivalent of sodium chloride.

38. The method of claim 37 wherein the soldering is effected sufficiently to leave anionic residue of at most about 3 $\mu g/cm^2$ equivalent of sodium chloride.

39. A method of heat soldering metal surfaces comprising applying a solder to the metal surfaces in the presence of an effective amount of the flux of claim 20 in coating disposition on the metal surfaces, and at a temperature sufficient for molten flow of the solder and for volatilization of the flux to leave the site essentially free from ionic residue.

40. A method of heat soldering metal surfaces comprising applying a solder to the metal surfaces in the presence of an effective amount of the flux of claim 25 in coating disposition on the metal surfaces, and at a temperature sufficient for molten flow of the solder and for volatilization of the flux to leave the site essentially free from ionic residue.

41. A method of heat soldering metal surfaces comprising applying a solder to the metal surfaces in the presence of an effective amount of the flux of claim 31 in disposition on the metal surfaces, and at a temperature sufficient for molten flow of the solder and for voltilization of the flux to leave an ionic residue of at most about 1.2 $\mu g/cm^2$ equivalent of sodium chloride.

42. The soldered product of the method of claim 37.

43. The soldered product of the method of claim 38.

44. The soldered product of the method of claim 41.

* * * * *